United States Patent

Sakai et al.

[15] 3,668,637

[45] June 6, 1972

[54] CHARACTER READER HAVING OPTIMUM QUANTIZATION LEVEL

[72] Inventors: Kunio Sakai, Tokyo; Sumio Katsuragi, Yokohama; Sadakazu Watanabe, Tokyo, all of Japan

[73] Assignee: Tokyo Shibaura Electric Co., Ltd., Kawasaki-shi, Japan

[22] Filed: Sept. 14, 1970

[21] Appl. No.: 72,095

[30] Foreign Application Priority Data

Sept. 16, 1969 Japan....................................44/72706
Dec. 11, 1969 Japan....................................44/90039

[52] U.S. Cl. ....................................................340/146.3AG
[51] Int. Cl. ..........................................................G06k 9/12
[58] Field of Search...............................................340/146.3

[56] References Cited

UNITED STATES PATENTS 3,479,642 11/1969 Bartz............................340/146.3 AG
3,466,603 9/1969 Shelton........................340/146.3 AG
3,196,398 7/1965 Baskin..........................340/146.3 AG

*Primary Examiner*—Daryl W. Cook
*Assistant Examiner*—William W. Cochran
*Attorney*—Flynn & Frishauf

[57] ABSTRACT

A character reader includes a photoelectric conversion device arranged to optically scan the surface of a record carrier bearing an original character to be read out, the output video signals thereof being supplied to a quantizer for quantizing each of the elemental areas on the surface which form a matrix of rows and columns at a threshold voltage level. The quantized pattern signals from the quantizer, comprised of the binary logical digits "1" and "0," are supplied to a quantized pattern storing device to be temporarily stored therein and also to an average character stroke width calculating device and a character block number calculating device. The calculating devices calculate respectively the average stroke width and block number of the original character on the record carrier from four adjacent contents in the matrix form (corresponding to four adjacent elemental areas) successively supplied from the quantizer. A quantization level evaluating device evaluates the outputs of the calculating devices and adjusts the threshold voltage level at the quantizer until it attains an optimum level. Then, the evaluating device opens a gate circuit coupled to the storing device and supplies through the gate circuit the quantized pattern corresponding to the output signals quantized by the quantizer at the optimum level to a quantized pattern recognition circuit to effect the actual reading of the original character.

9 Claims, 31 Drawing Figures

CHARACTER READER HAVING OPTIMUM QUANTIZATION LEVEL

The present invention relates to a character reader.

Recently in the fields of electronic computing, data transmitting, and machines for reading postal district numbers and sorting mail, an increasingly important role has been played by character readers for optically reading out an original character pattern consisting of various characters hand written or printed on a sheet of paper.

With such character readers, the original character pattern is generally optically scanned, for example, by a flying-spot device, television camera device or photocell assembly to convert it into the corresponding video signals. Said video signals are supplied to a quantizer for converting them at a predetermined voltage level to quantized pattern signals representing the binary logical digits "1" and "0" corresponding to the two black and white optical values of the original character pattern. Quantized pattern signals from the quantizer are supplied to a circuit for recognizing quantized patterns. From the arrangement of quantized pattern rows consisting of the binary logical digits "1" and "0," there is identified and read out the original character represented by said quantized pattern.

The foregoing is the fundamental mechanism of a character reader. If, in this case, the quantizer has an unduly high quantization level, then it will perform such a reading operation as will cause the character stroke to appear as if it had omitted or thinned out portions. Conversely, if said quantization is conducted at too low a level, then there will result such a reading operation as will cause the character image to be contaminated by stains and soils present on the paper surface other than the regular character stroke itself. Since the reading operation in either case will lead to erroneous reading or failure to read, there has been voiced a strong demand for development of a character reader as free as possible from the aforesaid erroneous reading or failure to read.

A typical method proposed to eliminate such erroneous reading or failure to read consists in providing a pair of quantizers carrying out quantization at different levels so as to connect the omitted or thinned out portions, if any, of a character stroke or reducing its width, if necessary, utilizing the logical conjunction or disjunction of outputs from these quantizers. However, this process is not a fundamental solution, because it is still likely to give rise to erroneous reading or failure to read. There is another known method in which, where there appears erroneous reading or failure to read, the quantization level of the quantizer is automatically adjusted in accordance with the condition of outputs from the circuit for distinguishing the quantized pattern so as to conduct reading a second time. However, such process not only causes waste in reading operation, but also presents difficulties in performing quantization constantly at an optimum level.

An object of the present invention is to provide a character reader including quantization level responsive apparatus in which at least one of the stated problems is alleviated.

SUMMARY OF THE INVENTION

A character reader according to the present invention comprises a photoelectric conversion device disposed to optically scan the surface of a record carrier bearing an original character marking to be scanned in succession in at least one of a horizontal and vertical direction so as to optically convert the markings on elemental areas of the surface into corresponding video signals, a quantizer receiving video signals from the photoelectric conversion device to quantize the video signals received from the photoelectric conversion device at a threshold voltage level for each of the elemental areas, the elemental areas forming a matrix of rows and columns, so as to generate quantized pattern signals comprised of at least binary logical digits "1" and "0" and a quantized pattern storing device coupled to the quantizer to temporarily store quantized pattern signals from the quantizer. Further included is a quantization level responsive apparatus including an average character stroke width calculating device coupled to the quantizer and arranged to calculate the average stroke width of the original character on the record carrier in response to changes in signals corresponding to at least four adjacent elemental areas in the matrix signals successively supplied from the quantizer, a character block number calculating device coupled to the quantizer and arranged to determine the block number of the original character on the record carrier in response to changes in signals corresponding to at least four adjacent elemental areas in the matrix signals successively supplied from the quantizer, a quantization level evaluating circuit coupled to both of the calculating devices and responsive to the output of both of the calculating devices to distinguish whether or not the quantizer conducted quantization at a proper level, a gate circuit coupled to the quantized pattern storing device and operated only when the result of determination by the evaluating circuit corresponds to the optimum level of quantization conducted by the quantizer, and a character recognition circuit connected to the output of the gate circuit so as to effect the actual reading of the original character in response to the quantized pattern appearing at the output of the gate circuit.

Figure 1:
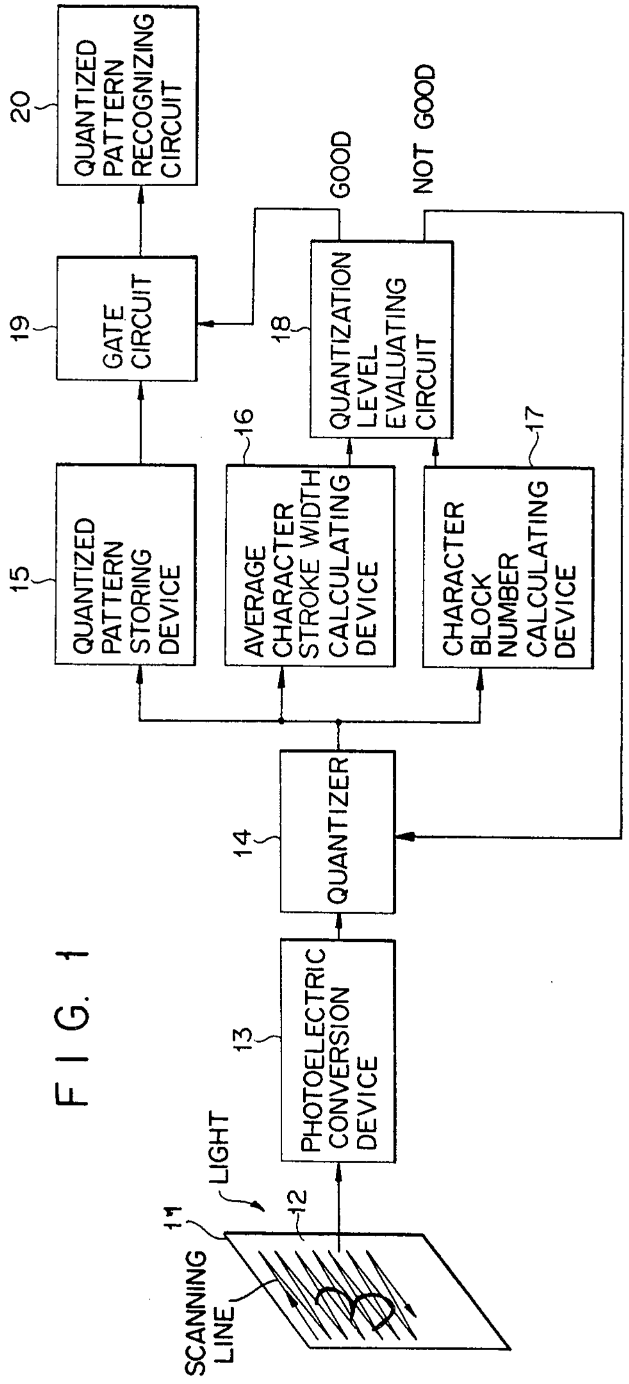
FIG. 1 is a block diagram of a character reading incorporating an optimum quantization level setting apparatus according to the present invention.
Figure 6:
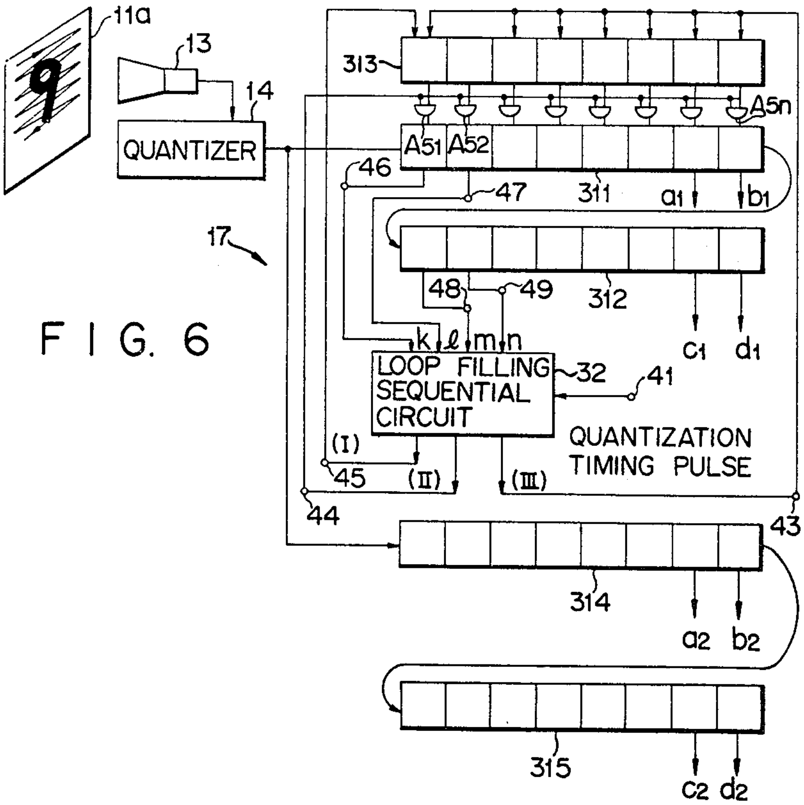
FIG. 6 is a block diagram of a circuit arrangement of the character block number calculating device of FIG. 1.
Figure 15A:
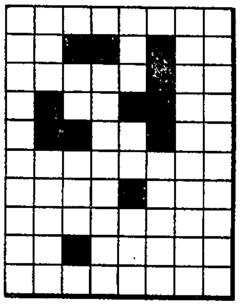
Figure 15B:
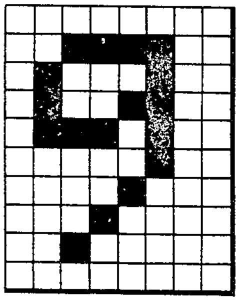
Figure 15C:
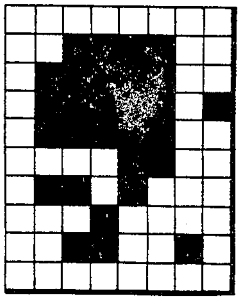
Figure 17E:
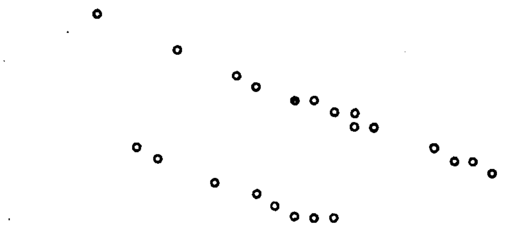
Figure 17D:
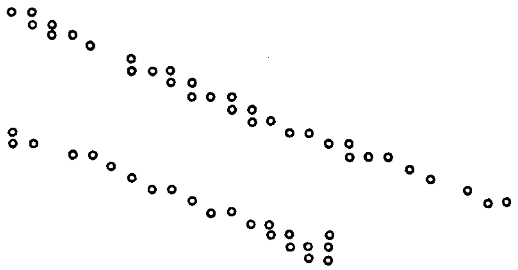
Figure 17C:
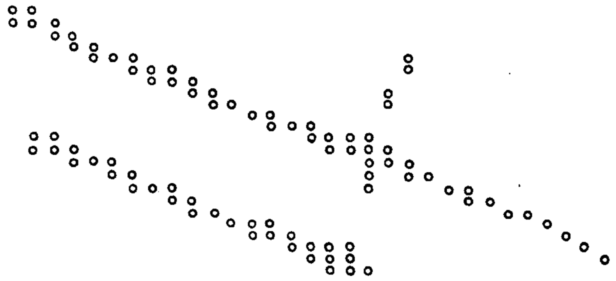
Figure 17B:
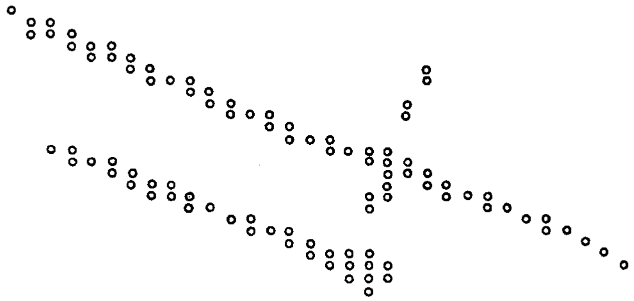
Figure 17A:
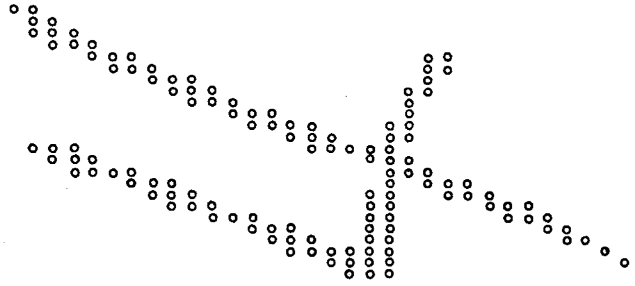
Figure 18:
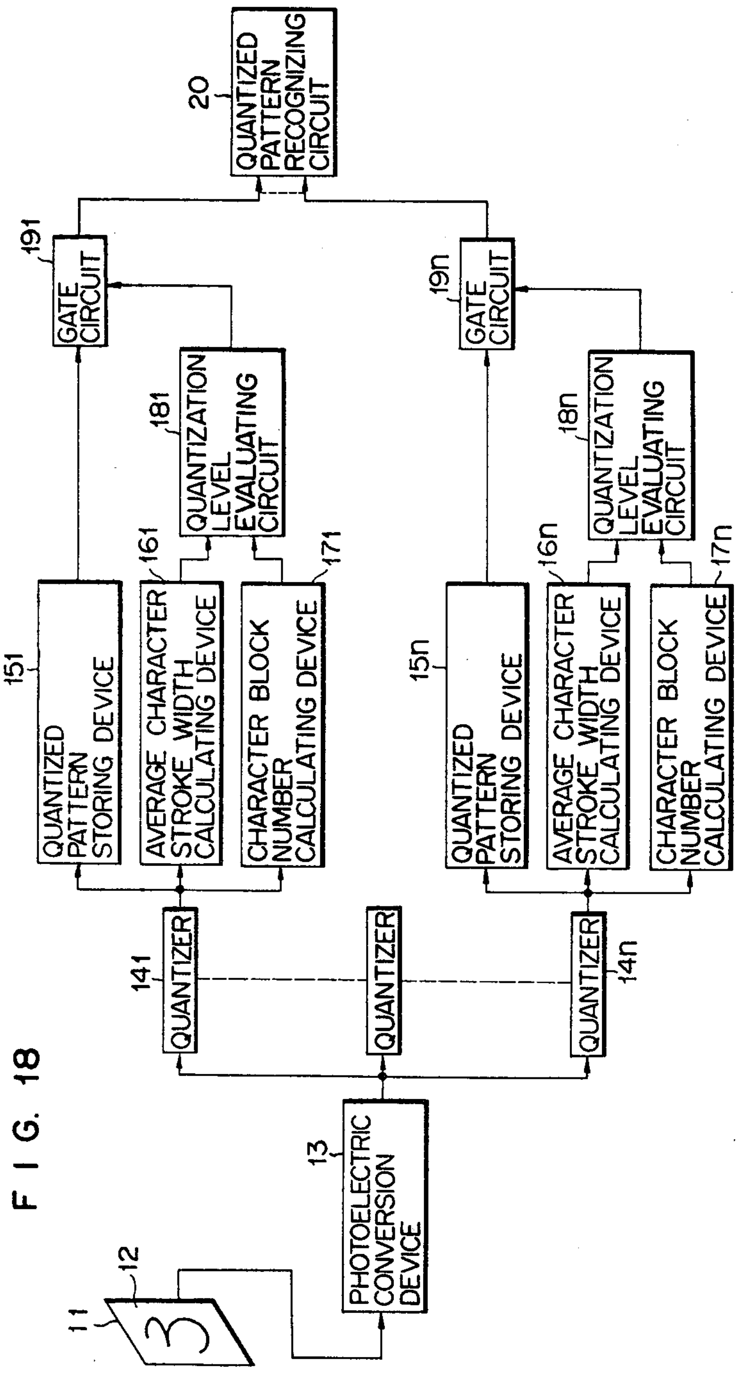

FIGS. 15A to 15C give patterns quantized at three different levels by the circuitry of FIG. 6;

FIGS. 16A to 16E represent the quantized patterns of a character "6" printed in dark shade where quantization was performed at five different levels by the circuitry of FIG. 1;

FIGS. 17A to 17E show the quantized patterns of a character "4" printed in light shade where quantization was conducted at five different levels by the circuitry of FIG. 1; and FIG. 18 schematically illustrates the circuit arrangement of another character reader according to the present invention.

There will now be described by reference to the appended drawings a preferred optimum quantization level setting apparatus for a character reader according to the present invention. As used herein, the term "character" is defined to encompass numerals, marks, alphabetical letters and any other configurations.

FIG. 1 is a schematic circuit diagram of one of the preferred embodiments. The surface 12 of a record carrier 11 made of, for example, paper which bears hand written or printed original characters to be read out (For convenience of description, there is only shown a single character "3." Generally, however, there are recorded a plurality of characters in rows and columns) is successively scanned either horizontally or vertically by a known photoelectric conversion device 13 comprised of, for example, a flying-spot device, a television camera device, an image orthicon camera device or a photo-cell assembly to convert the optically light and dark portions of a character pattern to the corresponding video signals. Video signals from the photoelectric conversion device 13 are supplied to a quantizer 14 for successively forming quantized pattern signals representing the binary logical digits "1" and "0" rows at a threshold level predetermined for each of the elemental areas formed by dividing said surface 12 of the record carrier 11, as is well known, into a plurality of sections in the longitudinal and lateral directions. Quantized pattern signals from the quantizer 14 are conducted to a quantized pattern storing device 15 so as to be temporarily memorized therein and also to the later described device 16 for calculating the average width and device 17 for calculating the number of blocks of a character stroke. The outputs from the aforesaid devices 16 and 17 for calculating the average width and number of blocks respectively of a character stroke are supplied to a quantization level evaluating circuit 18 to determine whether quantization was conducted at a proper level by the quantizer 14.

When said quantization level evaluating circuit 18 concludes the level of quantization performed by the quantizer 14 to be improper, then the results of said evaluation are fed back to the quantizer 14 so as automatically to control the quantization level in accordance with the results of the evaluation and said quantizing operation is conducted again using the controlled quantization level. Only when the quantization level of the quantizer 14 is thus set at an optimum value, there is opened a gate circuit 19 to introduce the quantized pattern temporarily stored in the aforesaid storing device 15 into a quantized pattern recognizing circuit 20.

Figures 2, 3:
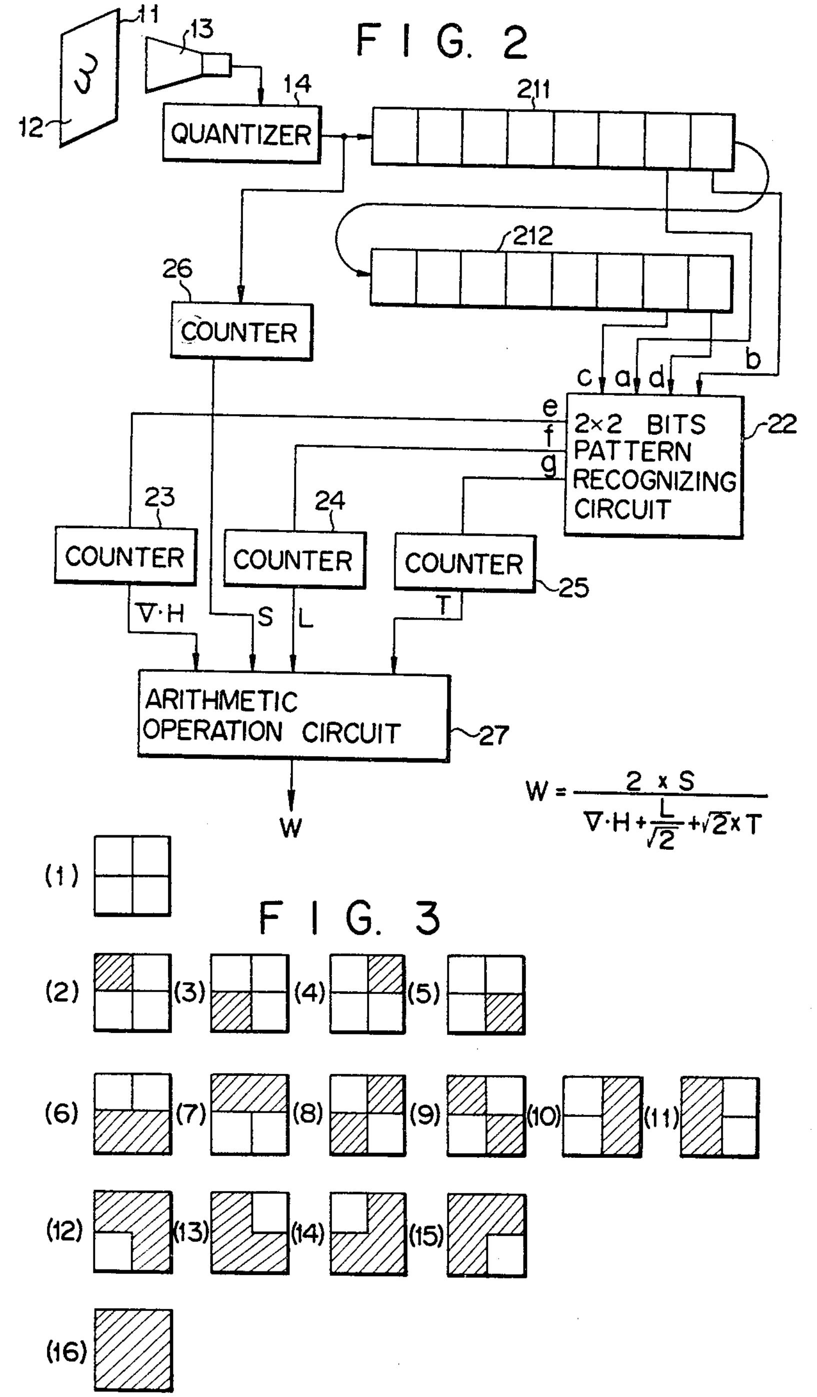
FIG. 2 is a diagram of a circuit arrangement of a device for calculating the average width of a character stroke.
FIG. 3 represents all combinations of 2×2 bits patterns supplied to the 2×2 bits pattern recognition circuit of FIG. 2.

FIG. 2 is a concrete circuit arrangement of the apparatus shown in FIG. 1 for calculating the average width of a character stroke. Quantized pattern signals from the quantizer 14 are supplied to shift registers 211 and 212 as illustrated, consisting of two serially connected rows each of eight bits having a bit arrangement corresponding to the arrangement of elemental areas and also a capacity corresponding to at least two elemental areas sections of each original character pattern arranged in the scanning direction.

The logical contents *a*, *b*, *c* and *d* of four adjacent bits included in the shift registers 211 and 212 in the longitudinal and lateral directions respectively are formed of various combinations of the logical digits "1" and "0" and momentarily change with the progress of scanning by the photoelectric conversion device 13. Said logical contents are divided into four groups as later described, only three of which are separately detected. The detected pattern signals of said three groups are supplied in turn to a 2×2 bits pattern recognizing circuit 22 used in detecting said changed logical contents as a unit outline length approximating the original character stroke.

Combinations of 2×2 bits patterns supplied from the shift registers 211 and 212 to the 2×2 bits pattern recognizing circuit 22 are separated into the following four groups:

i. As indicated by 6, 7, 10 and 11 of FIG. 3, two bits in the vertical or horizontal direction consist of the "1" (or "0" ) of the binary logical level corresponding to the black shown in hatching (or white shown in blank) level of the elemental area (hereinafter referred to as the "vertical-horizontal or V.H group"), ii. As indicated by 2, 3, 4 and 5 of FIG. 3, only one bit consists of the "1" of the binary logical level corresponding to the black level included in the two black and white values of the elemental area, or
as indicated by 12, 13, 14 and 15 of FIG. 3, only one bit consists of the "0" of the binary logical level corresponding to the white level included in the two black and white values of the elemental area (hereinafter referred to as the "L or slantwise group"), iii. As indicated by 8 and 9 of FIG. 3, two bits in the diagonal direction consist of "1" or "0" corresponding to the black or white level of the elemental area (hereinafter referred to as the "T or double inclined group"), and iv. As indicated by 1 and 16 of FIG. 3, all the four bits consist of "1" or "0" corresponding to the black or white level of the elemental area (hereinafter referred to as the "N group").

Thus there are 16 quantized patterns in all. Of the aforementioned four groups, the N group represents the interior void space confined within the outline of an original character or the outside area thereof, and not the outline itself. Accordingly, a unit outline length corresponding to the N group is zero, so that there is no need for the 2×2 bits pattern recognizing circuit 22 to detect outputs corresponding to said N group. Thus, it is only required to detect outputs corresponding to the three groups V.H, L and T.

Figure 4:
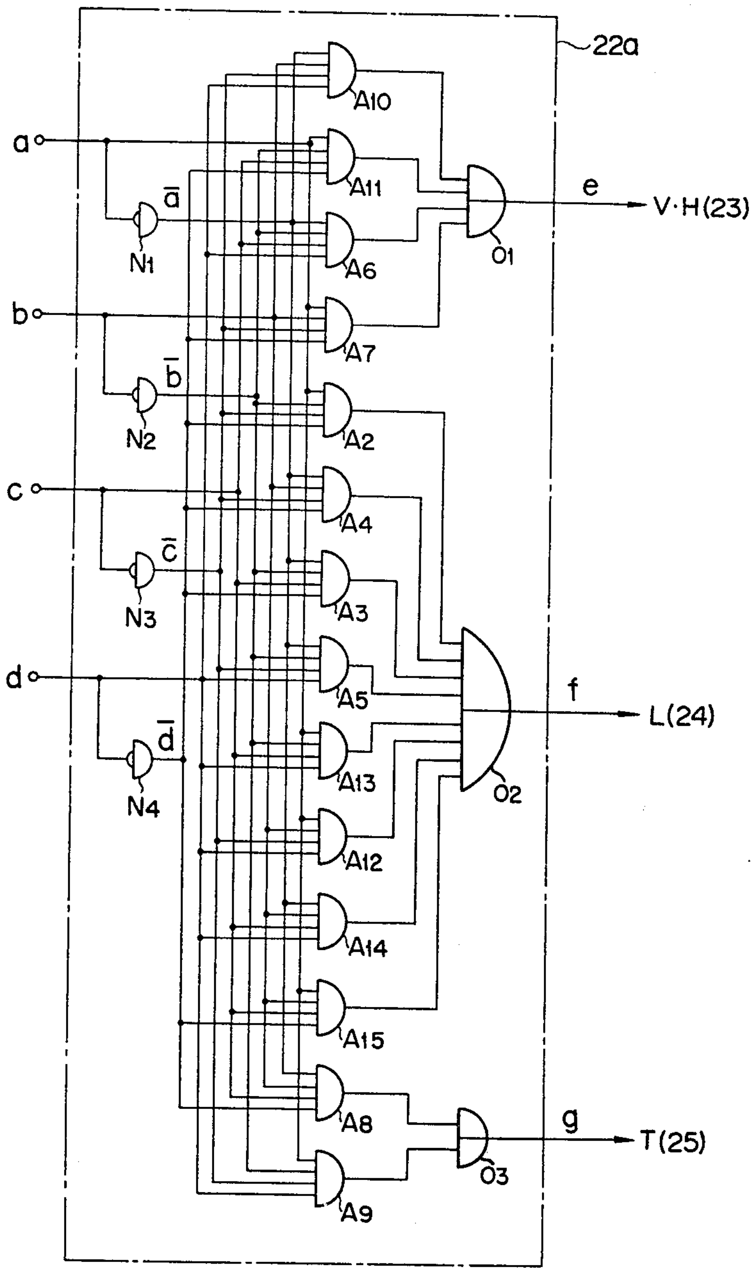
FIG. 4 is a diagram of the logical circuit of the 2×2 bits pattern recognition circuit of FIG. 2.

FIG. 4 represents a diagram of the logical circuit 22*a* included in the 2×2 bits pattern recognizing circuit 22. Identification of the fourteen 2×2 bits patterns indicated by 2 to 15 is effected by 14 four-input AND gates $A_{10}$, $A_{11}$, $A_6$, $A_7$, $A_2$, $A_4$, $A_3$, $A_5$, $A_{13}$, $A_{12}$, $A_{14}$, $A_{15}$, $A_8$ and $A_9$ given in the sequential order starting with the top of FIG. 4 (the subscript numerals attached thereto correspond to the numbers of the 2×2 bits patterns shown in FIG. 3), to which there are supplied the logical contents *a*, *b*, *c* and *d* of outputs from the 2×2 bits sections of the shift registers 211 and 212 and other logical contents $\bar{a}$, $\bar{b}$, $\bar{c}$ and $\bar{d}$ obtained by passing the aforementioned logical contents *a*, *b*, *c* and *d* through NOT gates $N_1$, $N_2$, $N_3$ and $N_4$, in the corresponding combinations to the 2×2 bits patterns of FIG. 3, for example, $\bar{a}$, $\bar{b}$, *c*, *d* for the AND gate $A_6$; *a*, $\bar{b}$, $\bar{c}$, $\bar{d}$ for the AND gate $A_2$ and $\bar{a}$, *b*, *c*, $\bar{d}$ for the AND gate $A_8$.

Outputs from the AND gates $A_6$, $A_7$, $A_{10}$ and $A_{11}$ belonging to the V.H group are passed through a common OR gate $\mathbf{0}_1$, outputs from the AND gates $A_2$ to $A_5$ and $A_{12}$ to $A_{15}$ belonging to the L group are passed through a common OR gate $\mathbf{0}_2$, and outputs from the AND gates $A_8$ and $A_9$ belonging to the T group are passed through a common OR gate $\mathbf{0}_3$. Outputs from the output terminals *e*, *f* and *g* of said three OR gates $\mathbf{0}_1$, $\mathbf{0}_2$ and $\mathbf{0}_3$ are supplied to corresponding counters 23, 24 and 25. Thus with the progress of scanning by the photoelectric conversion circuit 13, the counters 23, 24 and 25 separately count the number of 2×2 bits patterns belonging to the V.H, L and T groups respectively read out from the output terminals *e*, *f* and *g* of the 2×2 bits pattern recognition circuit 22 or 22*a*. Another counter 26 counts the number S of "1" included in the binary logical digits which corresponds to the black level of quantized pattern signals successively supplied from the quantizer 14 to the shift registers 211 and 212.

It will be apparent that the average width W of an original character stroke may be determined by the following equation:

$$W = \frac{\text{Area occupied by black portion of entire character stroke}}{\text{Length of entire character stroke along its central part}} \quad (1)$$

The average width of a character stroke may also be determined from the entire outline length of a character in place of its length along the central part used as the denominator of the above equation. Since the outline of a character includes an inner and an outer outline, the entire outline length of a character is about twice its length along the central part. Thus results the following equation:

$$W=\frac{\text{Area occupied by black portion of entire character stroke}}{\frac{1}{2}\times\text{entire outline length of a character}} \quad (2)$$

Now let it be assumed that (1) where two quantized signals representing horizontal or vertical bits given forth from the output terminal *e* of the 2×2 bits pattern recognizing circuit 22 or 22*a* consist of "1," the output of the V.H group assumes a numerical value of 1; (2) where a quantized signal representing only one of two horizontal and vertical bits supplied from the output terminal *f* of said circuit 22 or 22*a* consists of "1" or "0," the output of the L group has a value of ($1/\sqrt{2}$); and (3) where quantized signals representing two slantwise bits conducted from the output terminal *g* of said circuit 22 or 22*a* consist of "1," the output of the T group shows a value of ($1/\sqrt{2}$) × 2 = $\sqrt{2}$. When, upon completion of scanning of an original character by the photoelectric conversion device 13, there is calculated a sum M of (number of counts in the counter 23 × 1) + (number of counts in the counter 24 × [$1/\sqrt{2}$]) + (number of counts in the counter 25 × $\sqrt{2}$), then the entire outline length of said character may be determined. Also the number of counts indicated by the counter 26 at the end of said scanning will denote the area R of the black portion of the entire stroke of said character.

At the end of said scanning, the values indicated by the counters 23 to 26 are supplied to an arithmetic operation circuit 27 and are representative of the values of the aforementioned M and R, and divides the value of R by that of M, the arithmetic operation circuit 27 so as to calculate the value of the aforementioned equation (2), that is, the average width of said original character.

It will be noted at this point that pattern signals consisting of the binary logical digits "1" and "0" which are quantized in the quantizer 14 per elemental area of the pattern of an original character do not always represent the elemental areas which are entirely black or white. Instead, where the greater part of each elemental area is black or white, quantization is carried out by designating said elemental area as "1" or "0." Accordingly, the average width of a character stroke calculated by the arithmetic operation circuit 27 in the aforementioned manner is not a true value but an average value of the whole character.

Figure 5A:
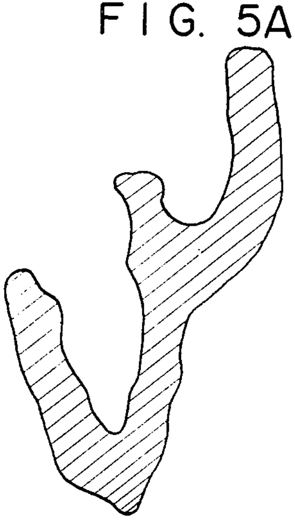
FIG. 5A is an enlarged view of an original character appearing on the record carrier of FIG. 1.
Figure 5B:
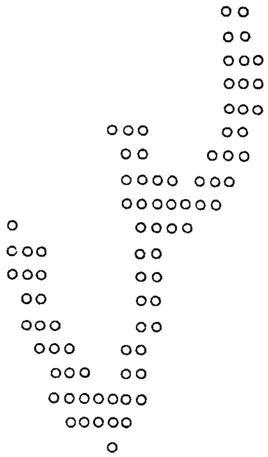
FIG. 5B is a quantized pattern of the original character of FIG. 5A obtained from the quantizer of FIG. 2.

FIG. 5A is an enlarged view of an original character pattern appearing on the record carrier 11. FIG. 5B illustrates said original character pattern derived from quantization in the circuit of FIG. 2. This illustration is formed of 38 2×2 bits patterns of the V.H group counted by the counter 23, 60 2×2 bits patterns of the L group counted by the counter 24, none of the 2×2 bits patterns of the T group counted by the counter 25, and 84 2×2 bits patterns counted by the counter 26. From these values is calculated by the arithmetic operation circuit 27 the value of the aforementioned equation (2), that is:

$$W=\frac{84\times 2}{38+\frac{60}{\sqrt{2}}+\sqrt{2}\times 0}=2.08$$

In the character reader of this type, there generally exists an optimum average character stroke width which permits the reading out rate to be enhanced to its maximum extent. Any deviation from its optimum width will result in decrease in the reading out rate. Such a reading out operation has been actually practised and it was found that the optimum value of the average character stroke width is about 2 to 3. From this, it will be appreciated that in said example quantization has been effected at a relatively good level.

Where the arithmetic operation circuit 27 calculates too large a value for the average width of a character stroke, slight soils or stains present on the record carrier 11 other than a regular character stroke itself are likely to be detected with the character itself. Conversely, where the calculated value of said width is too small, there will appear omitted or thinned out portions on the detected character stroke. Either case will lead to erroneous reading or failure to read. The occurrence of such event means that quantization was not carried out at a proper level in the quantizer 14. In the event of such difficulties appearing, the present invention automatically controls the level of quantization conducted by the quantizer 14 by repeatedly conducting the quantizing operation until there is obtained an optimum level of quantization.

FIG. 6 is a block diagram of a circuit arrangement of the character block number calculating device 17 of FIG. 1. This device is intended to detect different directional or angular displacements of the respective unit segments of a character outline instead of determining its unit outline length thereby to calculate the number of blocks included in said character and, if required, the number of loops assumed thereby.

Now let it be assumed that there are obtained quantized patterns consisting of four adjacent bits in both vertical and horizontal directions, that is, 2×2 bits patterns. With the anticlockwise angular displacements of the outer outline formed by the 2×2 bits patterns designated as forward displacements (the angular displacements of the inner outline are denoted as backward displacements), there are obtained, as in FIG. 3, 16 2×2 bits pattern indicated by 1*a* to 16*a* of FIG. 7. The angular displacement of that part of the outer outline which consists of 2×2 bits patterns 2*a* to 5*a* amounts to $+\pi/2$ radian, that of 12*a* to 15*a* to $-\pi/2$ radian, that of 6*a*, 7*a*, 10*a* and 11*a* to zero (requiring no detection like 1*a* and 16*a*) and that of 8*a* and 9*a* to $-\pi/2\times 2=-\pi$ radian because the part of the outer outline consisting of 8*a* is equal to that which is formed by superposing 14*a* and 15*a* one on the other and the part of the outer outline consisting of 9*a* is equal to that which is formed by superposing 12*a* and 13*a* one on the other.

If determination is successively made anticlockwise of the angular displacement of all unit segments of the outer or inner outline C of given continuous analog configuration $f(r, \theta)$, then the total of said angular displacements will amount to $2\pi$ or $-2\pi$ and may be expressed by a numerical formula:

$$\oint_c \cdot d\theta = 2\pi \text{ or } -2\pi \quad (3)$$

In a digital pattern obtained by quantizing such analog configuration $f(r, \theta)$, integration of the value of the equation (3) above only results in addition of local angular displacements and the outcome of said addition will total $2\pi$ or $-2\pi$ as in the case of the aforesaid analog configuration. Therefore, the apparatus according to the present invention is intended to calculate the number of blocks and/or loops of a given digital pattern by defining the number of blocks as 1 when all angular displacements thereof are summed up to $2\pi$ and that of loops similarly as 1 when all angular displacements thereof amount to $-2\pi$. It will be apparent that in this case it is unnecessary successively to determine the angular displacement of all unit segments of the outline of said digital pattern, as the addition of local angular displacements in those parts of the quantized pattern which are represented by four adjacent bits in the vertical and horizontal directions, that is, 2×2 bits patterns, will give the same results.

Where it is desired to calculate only the number of blocks included in a given digital pattern which contains loops, it is only required to add up all angular displacements of the outline of said pattern after filling up a void space within each loop. To calculate the number of loops in said digital pattern, it is only required to calculate the difference between the sum of all local, angular displacements determined on a digital pattern having the void space within each loop filled up and that of another digital pattern having the void space within each loop left blank. In this case there can be determined the number of blocks from the outer outline of said digital pattern and the number of loops from the inner outline thereof.

Figure 12A:
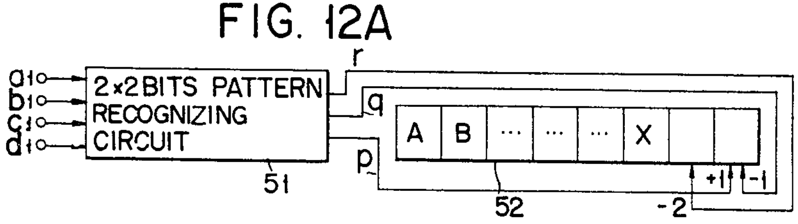
FIG. 12A shows a circuit for calculating the number of blocks included in the original character from the quantized pattern where the void space of a loop included therein was filled up by the loop filling sequential circuitry of FIG. 6.

In the arrangement of FIG. 6, there are provided shift registers 311 and 312 similar to the shift registers 211 and 212 of FIG. 2. Four quantized signals $a_1$, $b_1$, $c_1$ and $d_1$ representing respective two rear end bits of the shift registers 311 and 312 respectively, are successively supplied with the progress of scanning by the photoelectric conversion device 13 to a 2×2 bits pattern recognizing circuit 51 as shown in FIG. 12A arranged as described later to detect changes in the angular displacement of all unit segments of a character outline represented by quantized patterns consisting of various combinations of the binary digits "1" and "0" shown in FIG. 7. Quantized signals representing the contents *k*, *l*, *m* and *n* of respective two front end bits of said shift registers 311 and 312 respectively are successively supplied to a loop filling sequential circuit 32. Where quantized patterns obtained from the quantizer 14 include the quantized signals denoting the looped portions of a character stroke, said loop filling sequential circuit 32 detects the concave portions of said quantized pattern and fills up such portions in the following manner using another shift register 313 provided in connection with the former shift register 311 with the same bit arrangement (in the illustrated embodiment comprising eight bits).

Accordingly, it is only after the void space within a loop defined by a character stroke is filled up that the angular displacement of all unit segments of a character outline is actually detected by the 2×2 bits pattern recognizing circuit 51 from the quantized signals representing four bits at the respective two rear ends of both shift registers 311 and 312. This operation is intended to calculate the number of blocks included in a character stroke.

Figure 7:
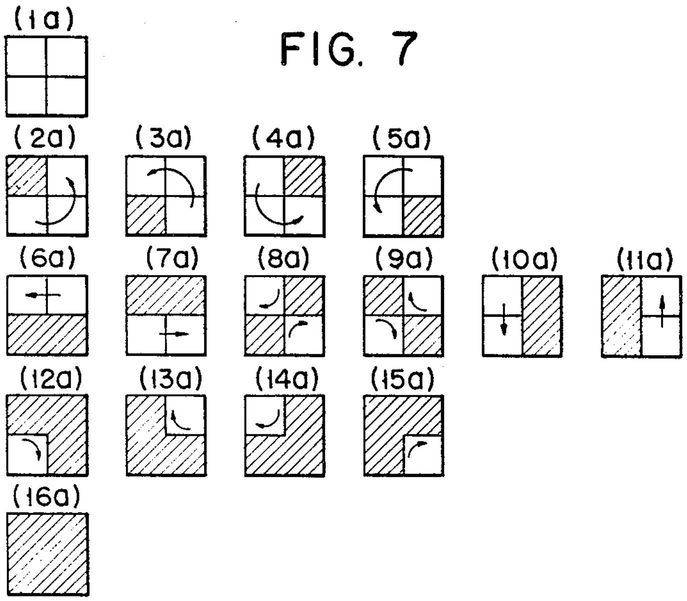
FIG. 7 represents all combinations of 2×2 bits quantized patterns to be separately distinguished by the circuitry of FIG. 6.
Figure 8A:
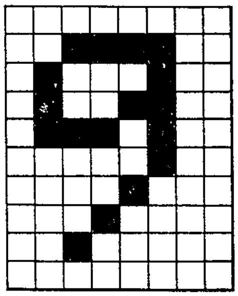
FIG. 8A illustrates a quantized pattern of the original character "9" of FIG. 6 obtained from a quantizer 14.
Figure 8B:
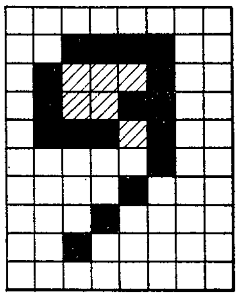
FIG. 8B is the quantized pattern of FIG. 8A where the void space of a loop included therein was filled up by the loop filling sequential circuitry of FIG. 6.
Figure 9:
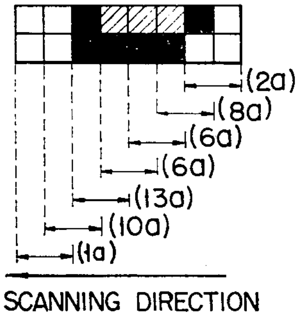
FIG. 9 shows one process during the operation of the loop filling sequential circuitry of FIG. 6.
Figure 10:
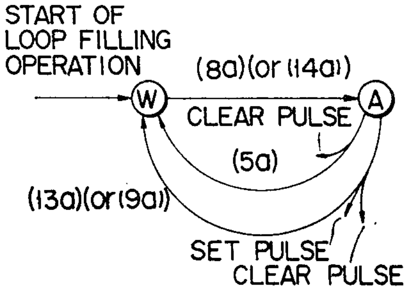
FIG. 10 is a state transition diagram of said loop filling operation.

Now let it be assumed that an original character on a record carrier 11*a* to be read out represents a numeral 9 shown in FIG. 6, and that a pattern quantized therefrom in the quantizer 14 through conversion by the photoelectric conversion device 13 assumes a shape indicated in FIG. 8A. Then, where the position of scanning by the photoelectric conversion device 13 is brought to the second and third rows of the quantized character pattern "9" of FIG. 8A, the contents of four bits at the respective two forward ends of both shift registers 311 and 312 are shifted sychronously with the timing of quantization by the quantizer 14 in the order of 2*a* → 8*a* → 6*a* → 6*a* → 13*a* → 10*a* → 1*a* included in the 2×2 bits patterns shown in FIG. 7. In this case, the 2×2 bits pattern 8*a* in the second position in the aforementioned series denotes one condition of forward ends of concave portions as later described, so that the loop filling sequential circuit 32 detects said condition and is shifted from ⓦ (normal non-operated state) to Ⓐ (operated state) of FIG. 10. Upon said shifting, the first bit of the shift register 313 representing the forward end of said concave portion is directly supplied with a start pulse or first drive pulse corresponding to the block portion of a character stroke which consists of the binary logical digit "1" which is fed from the loop filling sequential circuit 32 through a signal line I. When the contents of four bits at the respective two forward ends of both shift registers 311 and 312 are shifted to those of the 2×2 bits pattern 6*a* occupying the third position in the aforementioned shifting series, it does not indicate the condition of the concave portion, so that the loop filling sequential circuit 32 is not shifted from the aforementioned state of Ⓐ, namely, is still kept operative. Accordingly, the first bit of the shift register 313 is supplied with a second drive pulse from the loop filling sequential circuit 32 synchronously with the timing of quantization, causing the quantized pattern consisting of "1" temporarily stored in said first bit to be shifted to the second bit. When such shifting operation is repeated to cause the contents of four bits at the respective two forward ends of the shift registers 311 and 312 to be changed to those of the 2×2 bits pattern 13*a* assuming the fifth position in the aforesaid shifting series, then it denotes one condition of rear ends of concave portions as later described, so that the loop filling sequential circuit 32 detects said condition and is brought back from its operated state Ⓐ to its non-operated state ⓦ of FIG.10. At this time, said loop filling sequential circuit 32 generates a set pulse through a signal line II to shift through respectively corresponding AND gates $A_{51}$, $A_{52}$ ... $A_{5n}$ the contents stored in the shift register 313 to the first shift register 311 and thereafter produces a clear pulse through a signal line III to clear the contents of the shift register 313. The foregoing operation causes a blank portion present in the third row of the quantized character pattern "9" of FIG. 8A to be filled up with a black shade as indicated in hatching in FIG. 9. The same filling operation is also conducted with respect to the fourth and fifth rows of said quantized character pattern "9," completing the filling of the entire blank portion of the loop with a black shade. In the case of the quantized character pattern "9" of FIG. 8A, therefore, there is obtained a quantized pattern "9" having the entire blank portion of its loop filled up with a black shade as illustrated in FIG. 8B.

Where, after one condition of the forward ends of the concave portions as above-mentioned is detected in the aforesaid loop filling operation, there is not detected one condition of the rear ends of the concave portions at the rear end of that segment of a character stroke which is disposed in the same row in which there was detected the condition of the forward end of the concave portion, namely where there is detected the condition of the 2×2 bits pattern 5*a* of FIG. 7, then it means that the segment of the character stroke included in said row does not constitute part of a loop. In such case, therefore, the loop filling sequential circuit 32 is brought from the operated state Ⓐ back to the non-operated state ⓦ. At this time, said circuit 32 generates a clear pulse through the signal line III to clear the contents stored in the shift register 313 without shifting said contents to the first shift register 311.

Figure 11:
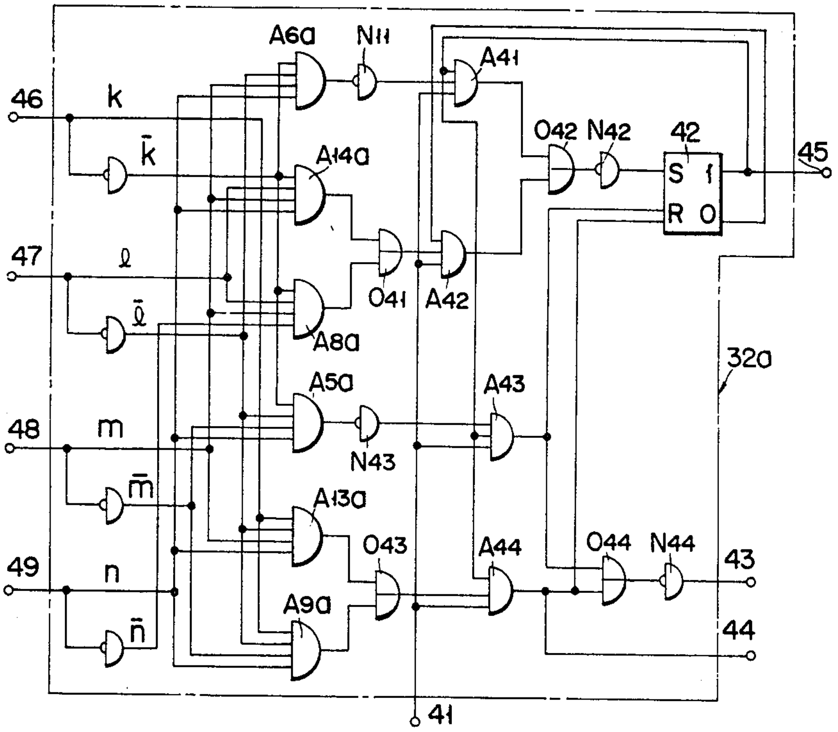
FIG. 11 is a diagram of the logical circuit of the loop filling sequential circuit of FIG. 6.

FIG. 11 is a concrete logical circuit 32*a* included in the loop filling sequential circuit 32. In a given configuration having a loop, the 2×2 bits pattern constituting the forward end of the concave portion of said loop consists of either 14*a* or 8*a* of FIG. 7, and the 2×2 bits pattern forming the rear end of the concave portion is either 13*a* or 9*a* of FIG. 7. A 2×2 bits pattern detected in the interim between the detection of the forward end of the concave portion and that of its rear end is only 6*a* of FIG. 7. A 2×2 bits pattern finally detected during said detecting operation which does not represent any part of said concave portion is only 5*a* of FIG. 7.

Accordingly, there are provided six AND gates A6*a*, A14*a*, A8*a*, A5*a*, A13*a* and A9*a* corresponding to the 2×2 bits patterns 6*a*, 14*a*, 8*a*, 5*a*, 13*a* and 9*a* of FIG. 7 of the various 2×2 bits patterns whose quantized signals are supplied to the four bits at the respective two forward ends of both shift registers 311 and 312. The output terminal of the AND gate A6*a* is passed through a NOT gate N11 to an AND gate A41, together with the signal at a terminal 41 to which there is supplied a pulse for defining the timing of quantization and the signal at the output terminal on the set side of a R-S flip-flop circuit 42; AND gate A41 has three input terminals. The signals at the output terminals of two AND gates A14*a* and A8*a* which indicate two conditions of a forward end of a concave portion are passed through a common OR gate O41 to a three-input terminal AND gate A42, together with the signal at the terminal 41 to which there is supplied a pulse for defining the timing of quantization and the signal at the output terminal on the reset side of said R-S flip-flop circuit 42. The output terminals of the AND gates A41 and A42 are connected to the set terminal of the flip-flop circuit 42 through an OR gate O42 and a NOT gate N42 connected in series.

The output terminal of the AND gate A5*a* is connected through a NOT GATE N43 to a three-input terminal AND gate A43, together with the aforementioned quantization timing pulse at terminal 41 and the signal at the output terminal on the set side of the flip-flop circuit 42. The output terminals of the two AND gates A13*a* and A9*a* at which signals appear indicating two conditions of a rear end of a concave portion are connected through a common OR gate O43 to a three-input terminal AND gate A44, together with the aforesaid quantization timing pulse at terminal 41 and the signal at the output terminal on the set side of the flip-flop circuit 42. The output terminals of said AND gates A43 and A44 are connected to the reset terminal of said flip-flop circuit 42 and to a terminal 43 for supplying the aforementioned clear pulse through a common OR gate O44 and a NOT gate N44 which are connected in series. The output terminal of said AND gate A44 is connected to a terminal 44 for supplying the aforesaid set pulse. The output terminal on the set side of the flip-flop circuit 42 is connected to the input terminal 45 of the first bit of the shift register 313. If the condition in which the output terminal on the set side of the flip-flop circuit 42 is brought to the position of the binary logical digit "1," that is, the position in which the flip-flop circuit 42 is arranged for a set state, is made to correspond to the operated state ⊗ of FIG. 10, and the condition in which the output terminal on the reset side of the flip-flop circuit 42 is brought to the position of the binary logical digit "1," that is, the position in which the flip-flop circuit 42 is arranged for a reset state, is made to correspond to the non-operated state ⊛ of FIG. 10, then the loop filling sequential circuit **32*a* constructed as described above can effect the aforementioned loop filling operation. Referring to FIG. 11, reference numerals 46, 47, 48 and 49 represent the output terminals of the four bits at the respective two forward ends of the shift registers 311 and 312**. Quantized pattern signals *k, l, m* and *n* from said output terminals 46 to 49 are supplied directly or through corresponding NOT gates N46, N47, N48 and N49 to the four-input terminals of the AND gates A6*a*, A14*a*, A8*a*, A5*a*, A13*a* and A9*a* respectively.

FIG. 12A shows a circuitry for calculating the number of blocks of a character stroke. This circuitry consists of the aforementioned 2×2 bits pattern recognizing circuit 51 to which there are supplied 16 2×2 bits quantized patterns indicated by **1*a* to 16*a* of FIG. 7 obtained from the four bits at the respective two rear ends of the shift registers 311 and 312 after the aforesaid loop filling operation and a reversible counter 52 to which there are supplied from said circuit 51** three output signals as described below.

It will be noted that among the 16 2×2 bits quantized patterns supplied to the 2×2 bits pattern recognizing circuit 51, **1*a* and 16*a* of FIG. 7 denote an area outside or inside of a character stroke, as do 1 and 16 of FIG. 3, that is, they do not represent the outline of a character itself, so that 1*a* and 16*a* need not be detected. It is also not necessary to detect 6*a*, 7*a*, 10*a* and 11*a* of FIG. 7, because the angular displacements of the unit segments of the character outline indicated thereby all amount to zero radian. Therefore, the 2×2 bits quantized patterns which should be actually detected by the 2×2 bits pattern recognizing circuit 51 are three groups: 2*a* to 5*a*, each of which indicates $+\pi/2$ radian, 12*a* to 15*a*, each of which indicates $-\pi/2$ radian and 8*a* and 9*a***, each of which indicates $-\pi$ radian. These three groups of 2×2 bits quantized patterns are separately detected by the three output terminals *p, q* and *r* of the 2×2 bits quantized pattern recognizing circuit 51 and supplied to the aforesaid reversible counter 52. If, in this case, the reversible counter 52 counts $+\pi/2$ radian as 1, $-\pi/2$ as $-1$ and $-\pi$ as $-2$, and outputs from the output terminals *p* and *q* of the 2×2 bits quantized pattern recognizing circuit 51 are supplied to the first bit at the rear end of said counter 52 and outputs from the output terminal *r* are supplied to the second bit at the rear end of said counter 52, then the counted value appearing through the sections A to X of said counter 52 will represent the number of blocks of the detected character. What should be noted at this point is that while the counter counts with an angular displacement of $+\pi/2$ radian taken as 1, an angular displacement of $2\pi$ radian determined on an actual block of a character stroke is counted as 4, so that a value arrived at by dividing the number of counts indicated by said counter 52 by 4 represents the actual number of character blocks.

Figure 13:
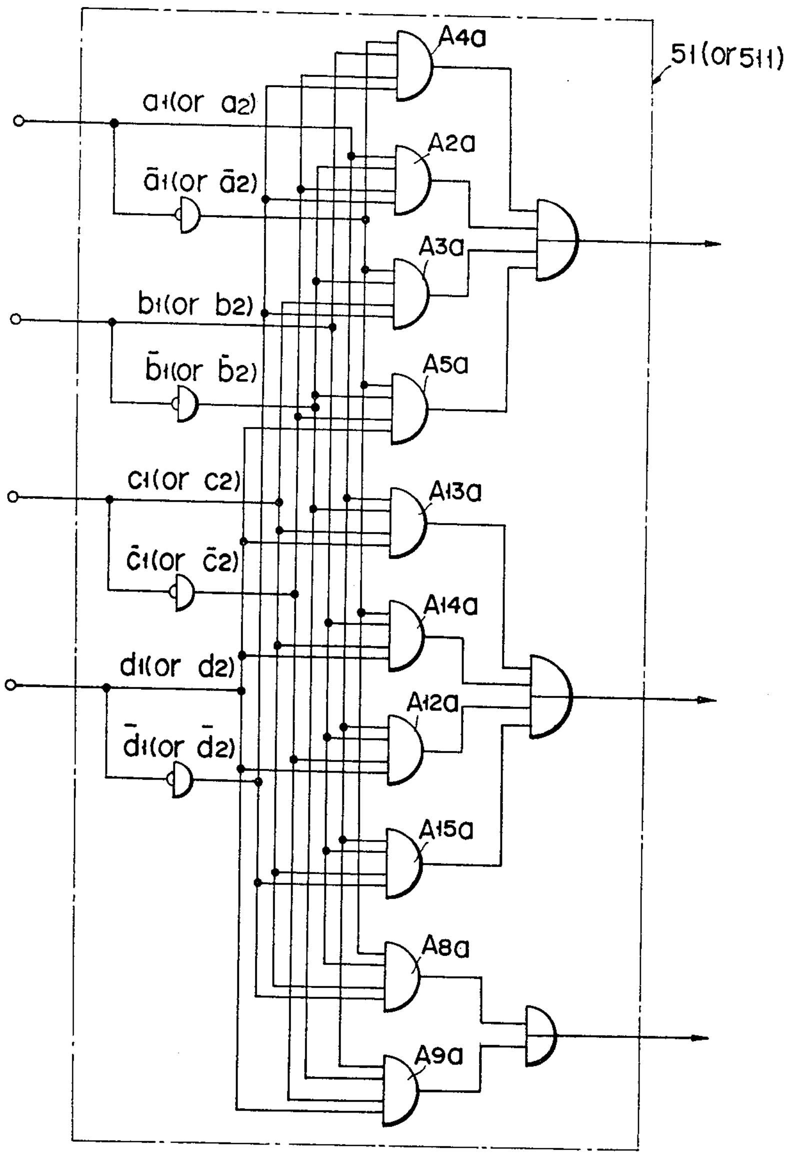
FIG. 13 is a diagram of a logical circuit included in the 2×2 bits quantized pattern recognizing circuits of FIGS. 12A and 12B.

FIG. 13 is a concrete illustration of a logical circuit 51 of the 2×2 bits quantized pattern recognizing circuit. This logical circuit 51 is substantially the same as that of FIG. 4 excepting that said circuit 51 is not provided with AND gates corresponding to the $A_6$, $A_7$, $A_{10}$ and $A_{11}$ of FIG. 4, so that the corresponding parts of FIG. 13 are denoted by the numerals corresponding to those of FIG. 4 and description thereof is omitted.

Figure 12B:
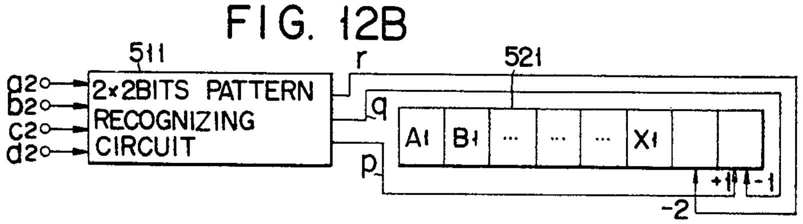
FIG. 12B represents a circuit for calculating a value (number of blocks-number of loops) from a quantized pattern where the void space of a loop included therein is not filled up.

Further, it is preferred that there be provided a circuit arrangement in which the 2×2 bits quantized patterns like **1*a* to 16*a* of FIG. 7 detected from the four bits at the respective two rear ends of shift registers 314 and 315 shown in FIG. 6 are supplied to a 2×2 bits quantized pattern recognizing circuit 511 of FIG. 12B having exactly the same construction as that of FIG. 12A and a reversible counter 521, the loop filling operation then not being performed by said shift registers 314 and 315**.

Figure 14:
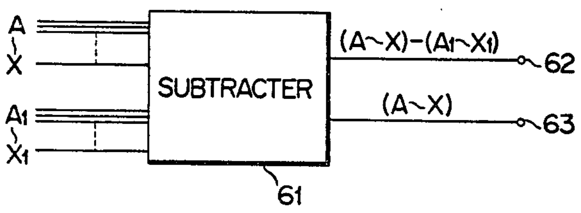
FIG. 14 is a schematic diagram of a circuit for calculating the number of blocks and loops from the results of calculation conducted by the circuits of FIGS. 12A and 12B.

Since the above-mentioned circuit arrangement does not conduct the loop filling operation, there are obtained from the 2×2 bits quantized pattern recognizing circuit 511 2×2 bits quantized patterns corresponding to the looped character "9" of FIG. 8A. The number of blocks included in said character can be calculated from the angular displacement of unit segments of the outer outline of said character and the number of loops defined by said character stroke from the angular displacement of unit segments of the inner outline thereof. Thus there is indicated in the $A_1$ to $X_1$ sections of the reversible counter 521 the result of calculation arrived at by deducting the number of loops from that of blocks. In the case of the character "9," the number of blocks equals 1 and that of loops similarly equals 1, so that said calculation gives zero. When, therefore, there are supplied values counted in the A to X sections of the reversible counter 52 and the $A_1$ to $X_1$ sections of the other counter 521 to a subtractor 61 of FIG. 14, then there can be obtained from the output terminal 62 of said subtractor 61 a value (A to X) − ($A_1$ to $X_1$), that is, the number of loops, and from the output terminal 63 thereof a value (A to X), that is, the number of blocks.

FIGS. 15A to 15C represent the quantized patterns of the original character "9" of FIG. 6 obtained by conducting quantization at different levels in the quantizer 14. FIG. 15A indicates that the number of blocks is 5 and that of loops is zero (the unduly high quantization level causes the occurrence of cut portions in the quantized character stroke). FIG. 15C shows that the number of blocks is 3 and that of loops is zero (due to the excessively low quantization level, the character stroke becomes so wide as to intrude into the void space defined by the loop, and stains and soils on the record carrier other than the character stroke are quantized as much as the stroke itself). These two figures result from quantization being carried out at an improper level, suggesting that resultant quantized patterns would likely be read erroneously or fail to be read.

In FIG. 15B, however, the number of blocks is 1 and that of loops is also 1, indicating, as apparent from the figure, that quantization was conducted properly. Accordingly, if the level of quantization by the quantizer 14 is well controlled automatically from the results of calculating the number of blocks or blocks and loops included in a character, then said quantization can be easily performed at an optimum level.

By way of reference, let us take, for example, the numerals 0 to 9 to indicate the number of blocks and loops. The numerals 0, 6 and 9 all have one block and one loop, the numeral 8 has one block and two loops, and the numerals 1, 2, 3, 4, 5 and 7 all have one block and no loop.

Referring again to FIG. 1, there may be used the results calculated by either the device 16 for calculating the average width of a character or the device 17 for calculating the number of blocks included in a character in automatically controlling the level of quantization by the quantizer 14. Where the quantization level in concluded to be improper, this procedure will present difficulties in defining whether such undesirable quantization level is too high or too low, leading to waste of time before there can be determined an optimum level of quantization. If, however, automatic control of the quantization level is effected, as shown in FIG. 1, by the results of calculation conducted by both of the aforesaid devices 16 and 17, the quantization level evaluating circuit 18 will immediately distinguish whether a given level of quantization, if found improper, is due to it being carried to a too high or too low side permitting the quick and reliable decision of an optimum level.

FIGS. 16A to 16E and FIGS. 17A to 17E respectively represent the quantized patterns of the original character "6" printed in dark shade and original character "4" printed in light shade obtained by quantization at five different levels respectively using the device of FIG. 1.

Every five pictures presented in both groups of figures represent in turn from the left to the right quantized patterns corresponding to the increasing levels of quantization conducted by the quantizer 14. Table 1 below gives the results of reading from the quantized patterns of the original character "6" shown in FIGS. 16A to 16E and table 2 below the results of reading from the quantized patterns of the original character "4" indicated in FIGS. 17A to 17E.

TABLE 1

Figure 16E:
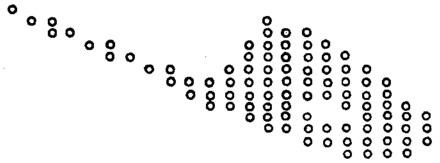
Figure 16D:
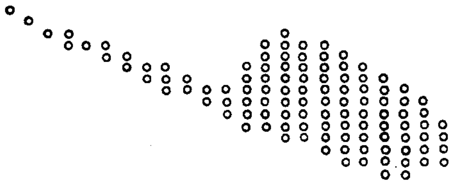
Figure 16C:
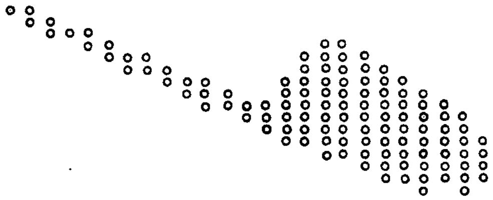
Figure 16B:
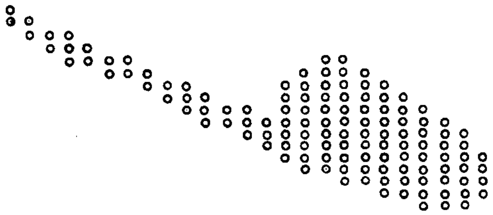
Figure 16A:
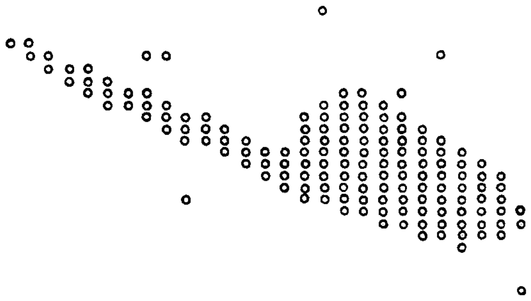

| Quantization level | FIG. 16A | FIG. 16B | FIG. 16C | FIG. 16D | FIG. 16E |
|---|---|---|---|---|---|
| Average width of character stroke | 3.2 | 3.5 | 3.3 | 3.4 | 2.8 |
| Number of blocks | 7 | 1 | 1 | 1 | 1 |
| Number of loops | 0 | 0 | 0 | 0 | 1 |
| Results of reading | Failure to read | Failure to read | Failure to read | Failure to read | "6" |

TABLE 2

| Quantization level | FIG. 17A | FIG. 17B | FIG. 17C | FIG. 17D | FIG. 17E |
|---|---|---|---|---|---|
| Average width of character stroke | 1.7 | 1.3 | 1.3 | 1.1 | 0.8 |
| Number of blocks | 1 | 4 | 4 | 5 | 8 |
| Number of loops | 0 | 0 | 0 | 0 | 0 |
| Result of reading | "4" | Failure to read | Failure to read | Failure to read | Failure to read |

Referring to table 1 above, the quantized pattern of FIG. 16A shows that it has so large a width on average due to quantization being conducted at too low a level that the void space within the loop is fully filled up and further includes a large number of quantized spots corresponding to stains and soils on the record carrier other than the character stroke itself, proving that said quantization was performed at an improper level. In contrast, the quantized pattern of FIG. 16E indicates that quantization was carried out at an optimum level, the void space within the loop is left open and the number of blocks and that of loops are both indicated as 1.

On the other hand, the quantized patterns of FIGS. 17A to 17E display a reverse aspect to those of FIGS. 16A to 16E. Namely, FIG. 17E shows that quantization was conducted improperly at too high a level to cause the quantized character stroke to have too narrow an average width and be cut at several places, and in consequence the character seems to consist of many blocks. However, FIG. 17A indicates that quantization was performed at an optimum level, the quantized character stroke has a proper width and assumes a continuous form, showing the number of blocks to be 1. Thus it may be concluded that the occurrence of a quantized character stroke having an unduly large average width and many character blocks results from the too low level of quantization conducted by the quantizer 14, causing stains and soils on the record carrier other than the character stroke itself to be also quantized and detected as if they constituted part of said character stroke, whereas the appearance of a quantized character stroke having an excessively small average width and also many character blocks arises from the too high level of quantization performed by said quantizer 14, resulting in missing portions in the quantized character pattern.

FIG. 18 is a schematic circuit diagram of another apparatus for setting quantization at an optimum level according to the present invention adapted for use in a character reader. As in FIG. 1, quantization is effected by a single quantizer 14. When said quantization level is determined to be improper by the quantization level evaluating circuit 18, the results of said determination are fed back to the quantizer 14 thereby automatically to control the level of quantization carried out by said quantizer 14. However, the apparatus has a shortcoming that there is sometimes involved a loss time during the reading out operation, since it is necessary to repeat the same operation when the quantization level is not good. In contrast, the embodiment of FIG. 18 causes video signals from the photoelectric conversion device 13 to be quantized simultaneously by a plurality of quantizers $\mathbf{14_1}$ ..... $\mathbf{14_n}$ which perform quantization at different levels. Among these levels, there is included an optimum quantization level experimentally predetermined. Quantized pattern signals from said quantizers $\mathbf{14_1}$ to $\mathbf{14_n}$ are supplied to the corresponding quantized pattern storing devices $\mathbf{15_1}$ .....$\mathbf{15_n}$, average character stroke width calculating devices $\mathbf{16_1}$ ..... $\mathbf{16_n}$ and character block number calculating devices $\mathbf{17_1}$ ..... $\mathbf{17_n}$. Results of calculation from said average character stroke width calculating devices $\mathbf{16_1}$ to $\mathbf{16_n}$ and character block number calculating devices $\mathbf{17_1}$ to $\mathbf{17_n}$ are supplied to the corresponding quantization level evaluating circuits $\mathbf{18_1}$ .....$\mathbf{18_n}$. Output from that of said quantization level evaluating circuits $\mathbf{18_1}$ to $\mathbf{18_n}$ which produces an optimum quantized pattern is used in the actual reading of an original character by opening only the corresponding gate circuit. The parts of FIG. 18 corresponding to those of FIG. 1 are denoted by the corresponding numerals and description thereof is omitted. The embodiment of FIG. 18 not only can be practised in the same manner and with the same effect as that of FIG. 1, but also involves no loss time as seen in FIG. 1. In the embodiment of FIG. 18, the level of quantization is, of course, determined from not only the average character stroke width and number of blocks but also the number of loops which are all calculated in the aforementioned manner. The reason is that as mentioned above, where the quantized character pattern presents an increased average width with the resultant decrease in the number of loops, this event is caused by the void space within the loop being unnecessarily filled up.

What we claim is:

1. A character reader which comprises:

a photoelectric conversion device disposed to optically scan the surface of a record carrier bearing an original character marking to be scanned in succession in at least one of a horizontal and vertical direction so as to optically convert the markings on elemental areas of said surface into corresponding video signals;

a quantizer receiving video signals from said photoelectric conversion device to quantize said video signals received from said photoelectric conversion device at a threshold voltage level for each of the elemental areas, said elemental areas forming a matrix of rows and columns, so as to generate quantized pattern signals comprised of at least binary logical digits "1" and "0;"

a quantized pattern storing device coupled to said quantizer to temporarily store quantized pattern signals from said quantizer; and a quantization level responsive apparatus including:

an average character stroke width calculating device coupled to said quantizer and arranged to calculate the average stroke width of the orginal character on the record carrier in response to changes in signals corresponding to at least four adjacent elemental areas in the matrix signals successively supplied from said quantizer;

a character block number calculating device coupled to said quantizer and arranged to determine the block number of the original character on the record carrier in response to changes in signals corresponding to at least four adjacent elemental areas in the matrix signals successively supplied from said quantizer;

a quantization level evaluating circuit coupled to both of said calculating devices and responsive to the outputs of both of said calculating devices to distinguish whether or not the quantizer conducted quantization at a proper level;

a gate circuit coupled to said quantized pattern storing device and operated only when the result of determination by said evaluating circuit corresponds to the optimum level of quantization conducted by the quantizer; and a character recognition circuit connected to the output of said gate circuit so as to effect the actual reading of the original character in response to the quantized pattern appearing at the output of said gate circuit.

2. A character reader according to claim 1 wherein the threshold quantization level of said quantizer is controllable, and, wherein said quantization level evaluating circuit is arranged to produce an output signal when the threshold level is not at its optimum level, said output signal being fed to the quantizer to alter the quantization level of said quantizer to an optimum level.

3. A character reader according to claim 1 including a plurality of quantizers, each provided with: a quantized pattern storing device, an average character stroke width calculating device, a character block number calculating device, a quantization level evaluating circuit and a gate circuit, said quantizers being arranged to quantize the video signals from the photoelectric conversion device at different levels, the actual reading of a character being effected by reading the contents of the quantized pattern storing device stored with quantized pattern signals from that quantizer whose quantization was conducted at the optimum level, as determined by the quantization level evaluating circuits.

4. A character reader according to claim 1 wherein said average character stroke width calculating device comprises shift registers successively supplied with quantized pattern signals from said quantizer and having a bit arrangement corresponding to the arrangement of elemental areas, each shift register having a capacity corresponding to at least two elemental areas of an original character on the record carrier which are arranged in the scanning direction; a 2×2 bits pattern recognizing circuit successively supplied with quantized pattern signals corresponding to four adjacent elemental areas in two adjacent rows and two adjacent columns in respect of a character, three different cases in respect of a quantized pattern existing, the first case being that of the quantized pattern signals representing two adjacent bits in a row or column of said 2×2 bits all consists of "1" or all consist of "0," the second case being that a quantized pattern signal representing any one only of said 2×2 bits consists of "1" or "0" and the third case being that quantized pattern signals representing both of two slantwise bits of said 2×2 bits consist of "1" or both consist of "0;" three counters for counting signals from the first 2×2 bits pattern recognizing circuit corresponding to the three cases respectively which represent a unit length approximating that of the original character stroke; a further counter for counting quantized pattern signals consisting of "1" from the quantizer; and an arithmetic operation circuit which, upon completion of scanning of the original character by the photoelectric conversion device, calculates the following value:

$$\frac{1}{2}\,\frac{\text{Number of counts indicated by second counter}}{\text{number of counts in said first case} \times 1 + \text{number of counts in said second case} \times \frac{1}{\sqrt{2}} + \text{number of counts in said third case} \times \sqrt{2}}.$$

5. A character reader according to claim 1 wherein said photoelectric conversion device scans said original character in the horizontal direction.

6. A character reader according to claim 1 wherein the character block number calculating device comprises two first shift registers successively supplied with quantized pattern signals from the quantizer and having a bit arrangement corresponding to the arrangement of elemental areas, each register having a capacity corresponding to at least two elemental areas of an original character on a record carrier arranged in the scanning direction; a loop filling circuit successively supplied with quantized 2×2 bits pattern signals representing two adjacent bits at the forward end of each of said shift registers, said circuit being brought to a set state when there are detected quantized pattern signals corresponding to the forward end of a loop included in the original character, and being brought to a reset state when there are detected quantized pattern signals corresponding to the rear end of said loop; a second shift register wherein, when the loop filling circuit is in a set state, the first bit at the forward end of said second register is supplied with quantized pattern signals consisting of "1," and the second and subsequent bits of said second register are supplied in turn with quantized signals consisting of "1" synchronously with the timing of quantization by the quantizer until the loop filling circuit is brought back to a reset state, and upon resetting of the loop filling circuit, the contents stored therein are cleared by being transferred to one of the first registers; a 2×2 bits pattern recognizing circuit successively supplied after the filling of the loop with quantized pattern signals representing four bits at the respective two rear ends of the first shift registers so as separately to detect quantized pattern signals denoting three different angular displacements of the unit length of a quantized character pattern approximating that the original character outline associated with three different cases: the first case being that a quantized pattern signal representing any one only of said 2×2 bits consists of "1," the second case being that a quantized pattern signal representing any one only of said 2×2 bits consists of "0" and the third case being that quantized pattern signals representing two slantwise bits of said 2×2 bits both consist of "1" or both consist of "0;" and a reversible counter whose first bit at the rear end is supplied with an output 1 corresponding to the condition of said first case and an output −1 corresponding to the condition of said second case and whose second bit at the rear end is supplied with an output −2 corresponding to the condition of said third case, such that upon completion of the scanning of the original character by the photoelectric conversion device, the number of blocks of said character is counted according to the result of calculation conducted by the reversible counter.

7. A character reader according to claim 4 wherein the 2×2 bits pattern recognizing circuit comprises a plurality of AND gates each having four input terminals which are supplied with the corresponding 2×2 bits quantized pattern signals; and three OR gates which are supplied in common with outputs from the AND gates corresponding to those of the 2×2 bits quantized patterns involved in each of the aforesaid three cases which may be designated by the same numerical value.

8. A character reader according to claim 6 wherein the 2×2 bits pattern recognizing circuit comprises a plurality of AND gates each having four input terminals which are supplied with the corresponding 2×2 bits quantized pattern signals; and three OR gates which are supplied in common with outputs from the AND gates corresponding to those of the 2×2 bits quantized patterns involved in each of the aforesaid three cases which may be designated by the same numeral value.

9. A character reader according to claim 6 wherein the character block number calculating device further comprises two third shift registers provided with a 2×2 bits pattern recognizing circuit and a further reversible counter which is similar to the first mentioned reversible counter, and which is connected to the third shift registers and calculates a value (number of blocks—number of loops) in accordance with the angular displacements of the unit length of the outer and inner outlines of the original character, and further including means for calculating the number of loops included in said character by subtracting the aforementioned value from the number of blocks calculated by the first-mentioned reversible counter.

* * * * *